United States Patent Office 3,661,903
Patented May 9, 1972

3,661,903
HALO-SUBSTITUTED 2-AMINO-BENZYLAMINE-
MORPHOLIDES AND SALTS THEREOF
Gerd Kruger, Biberach (Riss), Otmar Zipp, Osnabruck,
and Johannes Keck, Josef Nickl, Hans Machleidt, Gerhard Ohnacker, Robert Engelhorn, and Sigfrid Puschmann, Biberach (Riss), Germany, assignors to Boehringer Ingelheim G.m.b.H., Ingelheim am Rhein, Germany
No Drawing. Continuation-in-part of application Ser. No. 872,778, Oct. 30, 1969, which is a continuation-in-part of application Ser. No. 555,696, June 7, 1966. This application Nov. 12, 1970, Ser. No. 88,985
Claims priority, application Germany, June 9, 1965,
T 28,754
Int. Cl. C07d 87/42
U.S. Cl. 260—247.2 A                    6 Claims ABSTRACT OF THE DISCLOSURE
Compounds of the formula

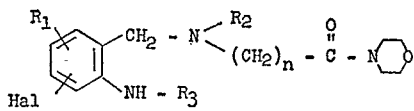

wherein
Hal is chlorine or bromine,
$R_1$ is hydrogen, chlorine or bromine,
$R_2$ is alkyl of 1 to 4 carbon atoms, phenyl or benzyl,
$R_3$ is hydrogen, alkanoyl of 2 to 4 carbon atoms, benzoyl, cholorobenzoyl, methoxybenzoyl, nicotinoyl or isonicotinoyl, or
$n$ is 1 or 2, and non-toxic, pharmacologically acceptable acid addition salts thereof; the compounds as well as their salts are useful as antitussives and respiration-stimulants.

This is a continuation-in-part of copending application Ser. No. 872,778, filed Oct. 30, 1969, now abandoned, which in turn is a continuation-in-part of application Ser. No. 555,696, filed June 7, 1966, now abandoned.

This invention relates to novel halo-substituted 2-amino-benzylamine-morpholides and acid addition salts thereof, as well as to various methods of preparing these compounds.

More particularly, the present invention relates to halo-substituted 2-amino-benzylamine-morpholides of the formula

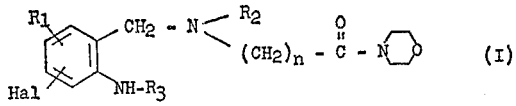      (I)

wherein
Hal is chlorine or bromine,
$R_1$ is hydrogen, chlorine or bromine,
$R_2$ is alkyl of 1 to 4 carbon atoms, phenyl or benzyl,
$R_3$ is hydrogen, alkanoyl of 2 to 4 carbon atoms, benzoyl, chlorobenzoyl, methoxybenzoyl, nicotinoyl or isonicotinoyl, and
$n$ is 1 or 2, and non-toxic, pharmacologically acceptable acid addition salts thereof.

The compounds according to the present invention may be prepared by a number of different methods involving well known chemical reaction principles, among which the following has proved to be most convenient and efficient:

By reacting a halo-substituted 2-diacylaminobenzyl halide of the formula

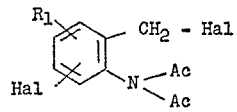

(II)

wherein $R_1$ and Hal have the same meanings as in Formula I and Ac is acyl, with a morpholide of the formula

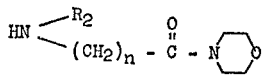

(III)

wherein $R_2$ and $n$ have the same meanings as in Formula I.

The reaction is carried out in the presence of an agent capable of tying up or neutralizing the hydrohalic acid released by the reaction, such as an inorganic or tertiary organic base or also a stoichiometric excess of the aminocarboxylic acid reagent III. The reaction is preferably performed in the presence of an inert organic solvent, such as carbontetrachloride, chloroform, ethanol, acetone, benzene or toluene, and it proceeds particularly rapidly at elevated temperatures, preferably at the boiling point of the particular solvent which is employed. If an excess of the aminocarboxylic acid III or a tertiary organic base is used as the hydrohalic acid-binding agent, these may simultaneously serve as the solvent medium.

The compounds of Formula I can also be prepared by reaction of a correspondingly substituted benzylamino carboxylic acid with a correspondingly substituted amine via the mixed anhydride with ethyl chloroformate.

In those instances where the above method yields a compound of the Formula I wherein the amino group attached to the benzene nucleus is diacylated, one of these acyl groups may, if desired, be split off according to conventional methods. On the other hand, if $R_3$ in Formula I is hydrogen, this hydrogen atom may, if desired, be replaced by an acyl group by customary methods.

The starting materials, that is, compounds of the Formulas II and III, are described in the prior art or may readily be prepared by processes described in the prior art.

For instance, a halo-substituted 2-diacylaminobenzyl halide of the Formula II may be prepared by reacting a corresponding halo-substituted 2-diacylamino-toluene with N-bromo-succinimide or with a halogen under ultra-violet irradiation.

The compounds of the Formula I above may be transformed into non-toxic, pharmacologically acceptable addition salts with inorganic or organic acids. Examples of non-toxic, pharmacologically acceptable acid addition salts are those formed with hydrochloric acid, hydrobromic acid, sulfuric acid, phosphoric acid, lactic acid, citric acid, tartaric acid, maleic acid, 8-chloro-theophylline or the like.

The following examples further illustrate the present invention and will enable others skilled in the art to understand it more completely.

EXAMPLE 1

N-(2-benzoylamino-6-chloro-benzyl)-N-methyl-glycine-morpholide (a) A mixture consisting of 9.75 gm. of 6-chloro-2-dibenzoylamino-benzyl bromide, 2.34 gm. of sarcosine methyl ester, 3.18 ml. of triethylamine and 250 ml. of chloroform was refluxed for five hours. Thereafter, an additional 0.5 gm. of sarcosine methyl ester was added, and the mixture was again refluxed for five hours. Subsequently, the chloroform was evaporated in vacuo, the residue was taken up in ethylacetate, the insoluble matter was separated by filtration, and the filtrate was again evaporated in vacuo. The residual oil was dissolved in methanol, the solution was admixed with 25 ml. of 2 N sodium hydroxide, and the mixture was allowed to stand overnight at about 20° C. Thereafter, the methanol was evaporated in vacuo, and the residual aqueous solution was adjusted to pH 2 with 2 N hydrochloric acid, then extracted with ethyl acetate and then adjusted to pH 6 with 2 N sodium hydroxide. The crystalline product precipitated thereby was collected by vacuum filtration and recrystallized from water, yielding N-(2-benzoyl-amino - 6 - chloro - benzyl) - N - methyl - glycine, M.P. 150–152° C.

(b) 80.7 gm. of N-(2-benzoylamino-6-chlorobenzyl)-N-methyl-glycine and 38 ml. of triethylamine were dissolved in 1 liter of dry chloroform. While stirring the resulting solution at —15° to —5° C., 23.4 ml. of ethyl chloroformate were rapidly added dropwise, and the mixture was stirred for 40 minutes more at —15 to —5° C. Thereafter, 50 ml. of morpholine were added all at once, and the mixture was allowed to stand at 20° C. for 20 hours. Subsequently, the chloroformic reaction solution was washed three times with brine, dried over magnesium sulfate and evaporated in vacuo, and the oily residue was taken up in ether, whereupon it crystallized. The crystalline product was recrystallized from methanol, yielding N - (2 - benzoylamino - 6 - chloro - benzyl) - N - methyl-glycine-morpholide, M.P. 122.5–123° C., of the formula

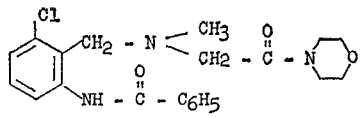

The product was dissolved in isopropanol, and the solution was acidified with anhydrous hydrochloric acid, yielding the hydrochloride, M.P. 206–208° C. (decomp.).

EXAMPLE 2

Using a procedure analogous to that described in Example 1, N - (2 - acetylamino - 3,5 - dibromo - benzyl)-N-methyl-glycine-morpholide, M.P. 118° C., of the formula

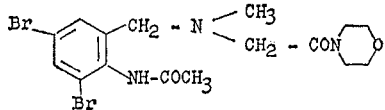

was prepared from N - (2 - acetylamino - 3,5 - dibromo-benzyl)-N-methyl-glycine and morpholine.

EXAMPLE 3

Using a procedure analogous to that described in Example 1, N - (2 - acetylamino - 4 - bromo - benzyl)-N-methyl-glycine-morpholide, M.P. 138–140° C., was prepared from N - (2 - acetylamino - 4 - bromo - benzyl)-N-methyl-glycine and morpholine.

EXAMPLE 4

Using a procedure analogous to that described in Example 1, N - (2 - acetylamino - 5 - bromo - benzyl)-N-methyl-glycine-morpholide, M.P. 151–154° C., was prepared from N - (2 - acetylamino - 5 - bromo - benzyl)-N-methyl-glycine and morpholine.

EXAMPLE 5

Using a procedure analogous to that described in Example 1, N - (2 - acetylamino - 3,5 - dibromo - benzyl)-N-ethyl-glycine-morpholide, M.P. 138° C., was prepared from N - (2 - acetylamino - 3,5 - dibromo - benzyl)-N-ethyl-glycine and morpholine.

EXAMPLE 6

Using a procedure analogous to that described in Example 1, N - (2 - acetylamino - 3,5 - dibromo - benzyl)-N-(n-butyl)-glycine-morpholide, M.P. 134° C., was prepared from N - (2 - acetylamino - 3,5 - dibromo - benzyl)-N-(n-butyl)-glycine and morpholine.

EXAMPLE 7

Using a procedure analogous to that described in Example 1, N-(2-acetylamino-3,5-dibromo-benzyl)-N-benzyl-glycine-morpholide, M.P. 102° C., was prepared from N - (2-acetylamino-3,5-dibromo-benzyl)-N-benzyl-glycine and morpholine.

EXAMPLE 8

Using a procedure analogous to that described in Example 1, N-(2-acetylamino-3,5-dibromo-benzyl)-N-ethyl-β-amino-propionic acid-morpholide, M.P. 115° C., was prepared from N-(2-acetylamino-3,5-dibromo-benzyl)-N-ethyl-β-amino-propionic acid and morpholine.

EXAMPLE 9

Using a procedure analogous to that described in Example 1, N-(2-acetylamino-6-chloro-benzyl)-N-methyl-glycine-morpholide, M.P. 166–167° C., was prepared from N-(2-acetylamino - 6 - chloro-benzyl)-N-methyl-glycine and morpholine.

EXAMPLE 10

Using a procedure analogous to that described in Example 1, N-(2-acetylamino - 6 - chloro-benzyl)-N-ethyl-glycine-morpholide, M.P. 141° C., was prepared from N-(2-acetylamino-6-chloro-benzyl)-N-ethyl-glycine and morpholine.

EXAMPLE 11

Using a procedure analogous to that described in Example 1, N-(2-acetylamino - 6 - chloro-benzyl)-N-(n-propyl)-glycine-morpholide, M.P. 154–155° C., was prepared from N-(2 - acetylamino-6-chloro-benzyl)-N-(n-propyl)-glycine and morpholine.

EXAMPLE 12

Using a procedure analogous to that described in Example 1, N-(2-acetylamino-6-chloro-benzyl)-N-isopropyl-glycine-morpholide, M.P. 170° C., was prepared from N-(2-acetylamino-6-chloro-benzyl)-N-isopropyl-glycine and morpholine.

EXAMPLE 13

Using a procedure analogous to that described in Example 1, N-(2-acetylamino-6-chloro-benzyl)-N-(n-butyl)-glycine-morpholide, M.P. 165–166° C., was prepared from N-(2 - acetylamino-6-chloro-benzyl)-N-(n-butyl)-glycine and morpholine.

EXAMPLE 14

Using a procedure analogous to that described in Example 1, N-(2-acetylamino-6-chloro-benzyl)-N-isobutyl-glycine-morpholine, M.P. 165–166° C., was prepared from N-(2-acetylamino-6-chloro-benzyl)-N-isobutyl-glycine and morpholine.

EXAMPLE 15

Using a procedure analogous to that described in Example 1, N-(2-acetylamino-6-chloro-benzyl)-N-benzyl-glycine-morpholide, M.P. 117–118° C., was prepared from N-(2-acetylamino-6-chloro-benzyl)-N-benzyl-glycine and morpholine.

EXAMPLE 16

Using a procedure analogous to that described in Example 1, N-(2-acetylamino-6-chloro-benzyl)-N-phenyl-glycine-morpholide, M.P. 166–167° C., was prepared from N-(2-acetylamino-6-chloro-benzyl)-N-phenyl-glycine and morpholine.

EXAMPLE 17

Preparation of N-(2-amino-6-chloro-benzyl)-N-methyl-glycine-morpholide

A mixture of 15.0 gm. of N-(2-amino-6-chlorobenzyl)-N-methyl-glycine, 17.5 gm. of 2-hydroxy-1-naphthaldehyde and 1 liter of absolute ethanol was boiled. The water formed thereby was continuously azeotropically distilled off, and fresh absolute ethanol was continuously added to the reaction mixture at the same rate as the water distilled off. After about three hours of boiling the reaction mixture was allowed to cool, the yellow crystalline precipitate formed thereby was separated by vacuum filtration, and the filter cake was washed with ethanol and ether, yielding N - [2-(2-hydroxy-1-naphthal-amino)-6-chloro-benzyl]-N-methyl-glycine, M.P. 185–187° C. (decomp.).

5.9 gm. of this intermediate product were dissolved in 100 cc. of absolute chloroform. The resulting solution was then admixed at −10° C. in an atmosphere of nitrogen and while stirring with 2.2 cc. of triethylamine and 1.5 cc. of ethyl chloroformate. The mixture was allowed to stand for twenty minutes at −10° C., 2.7 cc. of morpholine were added, and the reaction was allowed to proceed for one hour at 20° C. in an atmosphere of nitrogen. Thereafter, the reaction mixture was freed from solvent in vacuo and, to remove the amino-protective group, it was stirred for one and a half hours with 70 cc. of 0.5 N hydrochloric acid. The regenerated hydroxynaphthaldehyde was extracted with chloroform. The aqueous phase was neutralized with 35 cc. of 1 N sodium hydroxide, whereby a precipitate formed which was separated by vacuum filtration, washed with water and recrystallized from a mixture of methanol and water. The product was identified to be N-(2-amino-6-chloro-benzyl)-N-methyl-glycine-morpholide, M.P. 116–118° C.

EXAMPLE 18

Using a procedure analogous to that described in Example 1, N-(2-benzoylamino-6-chloro-benzyl)-N-methyl-glycine-morpholide, M.P. 122.5–123° C., was prepared from N-(2-benzoylamino - 6 - chloro-benzyl)-N-methyl-glycine and morpholine.

EXAMPLE 19

Preparation of N-(2-propionylamino-6-chloro-benzyl)-N-methyl-glycine morpholide

A mixture of 2.0 gm. of N-(2-amino-6-chlorobenzyl)-N-methyl-glycine-morpholide, 50 cc. of chloroform and 1 cc. of propionic acid anhydride was refluxed for one hour. Thereafter, the reaction solution was cooled, the excess unreacted anhydride was destroyed by adding methanol, the solution was evaporated in vacuo, the residue was taken up in chloroform, and the solution was washed with 1 N sodium hydroxide and water. The red solution thus obtained was decolorized by stirring with silicagel, filtered, the filtrate was evaporated, and the residue was recrystallized from a mixture of isopropanol and water. The product had a melting point of 86–88° C. and was identified to be N-(2-propionylamino-6-chloro-benzyl)-N-methyl-glycine-morpholide.

EXAMPLE 20

Preparation of N-(2-butyrylamino-6-chloro-benzyl)-N-methyl-glycine-morpholide

To a mixture of 2.0 gm. of N-(2-amino-6-chlorobenzyl)-N-methyl-glycine-morpholide and 1.2 cc. of triethyl-amine in 50 cc. of chloroform at −10° C. there were added 0.85 cc. of freshly distilled butyryl chloride. After two hours at room temperature the solution was washed with 1 N sodium hydroxide and water, dried, and evaporated in vacuo. The residue was dissolved in as little methanol as possible and water was added carefully thereto until the solution turned turbid. The precipitate formed was separated by vacuum filtration, washed with water and recrystallized from a mixture of isopropanol and water. It had a melting point of 67–68° C. and was found to be N-(2-butyrylamino-6-chloro-benzyl)-N-methyl-glycine-morpholide of the formula

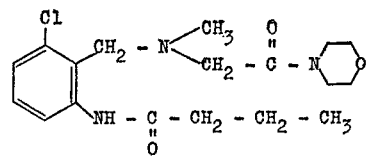

EXAMPLE 21

Using a procedure analogous to that described in Example 20, N - (2 - benzoylamino - 6-chloro-benzyl)-N-methyl-glycine-morpholide, M.P. 122.5–123° C., was prepared from N - ( 2 amino - 6-chloro-benzyl)-N-methyl-glycine-morpholide and benzoyl chloride.

EXAMPLE 22

Preparation of N-(2-benzoylamino-6-chloro-benzyl)-N-methyl-glycine-morpholide

A mixture of 17.4 gm. of 2-dibenzoylamino-6-chloro-benzyl bromide, 14.4 gm. of sarcosine-morpholide, 6.4 cc. of triethylamine and 500 cc. of carbon tetrachloride was refluxed for seven hours. Thereafter, the triethyl-ammonium bromide which had precipitated out was separated by vacuum filtration, and the filtrate was evaporated to dryness. The residue was recrystallized first from isopropanol and then from methanol, whereby the side product, N-benzoyl-sarcosine-morpholide, remained in solution. The recrystallized product had a melting point of 122.5–123° C. and was found to be identical with the product obtained in Examples 1 and 21.

The product was dissolved in isopropanol and the solution was acidified with anhydrous hydrochloric acid, yielding the hydrochloride of N-(2-benzoylamino-6-chloro-benzyl)-N-methyl-glycine-morpholide, M.P. 206–208° C. (decomp.).

EXAMPLE 23

Using a procedure analogous to that described in Example 20, N - [2 - (p-chloro-benzoyl-amino)-6-chloro-benzyl] - N - methyl-glycine-morpholide, M.P. 126–128° C., of the formula

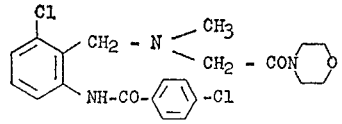

was prepared from N-(2-amino-6-chloro-benzyl)-N-methyl-glycine morpholide and p-chlorobenzoyl chloride.

EXAMPLE 24

Using a procedure analogous to that described in Example 20, N - [2-(p-methoxybenzoyl-amino)-6-chloro-benzyl]-N-methyl-glycine-morpholide, M.P. 158–160° C., was prepared from N-(2-amino-6-chloro-benzyl)-N-methyl - glycine - morpholide and p-methoxy-benzoyl chloride.

EXAMPLE 25

Preparation of N-(2-nicotinoylamino-6-chloro-benzyl)-N-methyl-glycine-morpholide 5.53 gm. of nicotinic acid and 6.3 cc. of triethyl-amine were dissolved in 150 cc. of chloroform, the solution was cooled to −10° C. and, while stirring, 4.36 cc. of ethyl chloroformate were added hereto. The mixture was maintained for 20 minutes at −10 to −5° C., and then a solution of 13.0 gm. of N-(2-amino-6-chloro-benzyl)-N-methyl-glycine-morpholide in 50 cc. of chloroform was added. The reaction mixture was allowed to stand at room temperature overnight, insoluble matter was filtered off, and the filtrate was washed with an aqueous potassium bicarbonate solution. The chloroform phase was dried over magnesium sulfate, evaporated to dryness in vacuo, and the residue was recrystallized first from ether and then from isopropanol. The purified product had a melting point of 122° C. and was identified to be N-(2-nicotinoyl - amino - 6 - chloro-benzyl)-N-methyl-glycine-morpholide of the formula

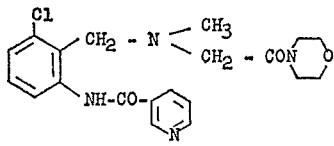

EXAMPLE 26

Using a procedure analogous to that described in Example 25, N - (2 - isonicotinoylamino-6-chloro-benzyl)-N-methyl-glycine-morpholide, M.P. 136° C., was prepared from N - (2 - amino-6-chloro-benzyl)-N-methyl-glycine-morpholide and isonicotinic acid.

EXAMPLE 27

Using a procedure analogous to that described in Example 22, N-(2-benzoylamino-6-chloro-benzyl)-N-ethyl-glycine-morpholide, M.P. 109–111° C., was prepared from 2 - dibenzoylamino - 6-chloro-benzyl bromide and N-ethyl-glycine-morpholide.

EXAMPLE 28

Using a procedure analogous to that described in Example 22, N - (2 - benzoylamino-6-chloro-benzyl)-N-isopropyl-glycine-morpholide, M.P. 125–127° C., was prepared from 2-dibenzoylamino-6-chloro-benzyl bromide and N-isopropyl-glycine-morpholide.

EXAMPLE 29

Using a procedure analogous to that described in Example 22, N - ( 2 - benzoylamino-6-benzyl)-N-phenyl-glycine-morpholide, M.P. 183–185° C., was prepared from 2 - dibenzoylamino-6-benzyl-bromide and N-phenyl-glycine-morpholide.

EXAMPLE 30

Using a procedure analogous to that described in Example 1, N-(2-benzoylamino-5-chloro-benzyl)-N-methyl-glycine-morpholide, was prepared from N-(2 - benzoyl-amino - 5-chloro-benzyl)-N-methyl-glycine and morpholine. Its hydrochloride had a melting point of 215° C. (decomp.).

EXAMPLE 31

Using a procedure analogous to that described in Example 1, N-(2-benzoylamino-4-chloro-benzyl)-N-methyl-glycine-morpholide, M.P. 95–96° C., was prepared from N-(2 - benzoylamino - 4 - chloro-benzyl)-N-methyl-glycine and morpholine.

The compounds according to the present invention, that is, those embraced by Formula I above and their non-toxic, pharmacologically acceptable acid addition salts, have useful pharmacodynamic properties. More particularly, they exhibit antitussive and respiration-stimulating activities in warm-blooded animals. In addition, they are useful as intermediates in the preparation of pharmacologically useful benzodiazepines an benzodiazocines.

For pharmaceutical purposes, the compounds according to the present invention are administered to warm-blooded animals perorally, parenterally or rectally as active ingredients in customary dosage unit compositions, that is, compositions in dosage unit form consisting essentially of an inert pharmaceutical carrier and one dosage unit of the active ingredient, such as tablets, coated pills, solutions, syrups, suspensions, capsules, wafers, suppositories and the like. One dosage unit of a compound according to the instant invention is from 0.166 to 5.0 mgm./kg., preferably 0.33 to 1.67 mgm./kg. body weight.

The following examples illustrates a few dosage unit compositions comprising a compound of the invention as the active ingredient. The parts are parts by weight, unless otherwise specified.

EXAMPLE 32

Syrup

The syrup was compounded from the following ingredients:

|  | Parts by vol. |
|---|---|
| N-(2 - benzoylamino - 6-chloro-benzyl)-N-methyl-glycine-morpholide hydrochloride | 0.5 |
| Tartaric acid | 0.5 |
| Ammonium chloride | 0.4 |
| Benzoic acid | 0.2 |
| Sugar | 65.0 |
| Sodium pyrosulfite | 0.1 |
| Flavoring | 0.2 |
| Certified food colors | 0.002 |
| Ethanol | 10.0 |
| Distilled water Q.s. ad | 100.0 |

Compounding procedure.—The distilled water was heated to 80° C., and then the benzoic acid, the tartaric acid, the ammonium chloride, the glycine compound, the food colors and the sugar were successively dissolved therein. The resulting syrup was cooled to room temperature, the sodium pyrosulfite was dissolved therein, and then a mixture of the flavoring and the ethanol was stirred in. The finished syrup was filtered through a suitable filter. 5 cc. of the finished syrup contained 25 mgm. of the active ingredient and, when administered perorally to a warm-blooded animal of about 60 kg. body weight in need of such treatment, produced very good antitussive and respiration-stimulating effects.

EXAMPLE 33

Drop solution

The solution was compounded from the following ingredients:

|  | Parts by vol. |
|---|---|
| N-(2 - acetylamino-6-chloro-benzyl)-N-(n-butyl)-glycine-morpholide | 0.5 |
| p-Hydroxybenzoic acid methyl ester | 0.07 |
| p-Hydroxybenzoic acid propyl ester | 0.03 |
| Polyvinylpyrrolidone | 5.00 |
| Distilled water Q.s. ad | 100.00 |

Compounding procedure.—The p-hydroxybenzoic acid esters, the polyvinylpyrrolidone and the glycine compound were successively dissolve in a sufficient amount of distilled water at 80° C. The resulting solution was cooled to room temperature, diluted with additional distilled water to the desired volume, and the solution was filtered until free from suspended particles. 1 cc. of solution contained 50 mgm. of the active ingredient and, when administered perorally to a warm-blooded animal of about 60 kg. body weight in need of such treatment, produced very good antitussive and respiration-stimulating effects.

EXAMPLE 34

Coated pills

The pill cores were compounded from the following ingredients:

|  | Parts |
|---|---|
| N-(2-acetylamino-6-chloro-benzyl)-glycine-morpholide hydrochloride | 25.0 |
| Lactose | 120.0 |
| Potato starch | 67.0 |
| Polyvinylpyrollidone | 6.0 |
| Magnesium stearate | 2.0 |
| Total | 220.0 |

Compounding procedure. — The glycine-morpholide compound, the lactose and the potato starch were intimately admixed with each other, the mixture was moistened with an aqueous 12.5% solution of the polyvinylpyrrolidone, and the moist mass was forced through a 1.5 mm.-mesh screen. The resulting granulate was dried at 45° C. and again passed through a 1.0 mm.-mesh screen. The dry granulate was then thoroughly admixed with the magnesium stearate, and the mixture was compressed into 220 mgm.-pill cores, which were subsequently coated with a thin shell consisting essentially of talcum and sugar. The coated pills were finally polished with beeswax. Each pill contained 25 mgm. of the active ingredient and, when administered perorally to a warm-blooded animal of about 60 kg. body weight in need of such treatment, produced very good antitussive and respiration-stimulating effects.

EXAMPLE 35

Tablets

The tablet composition was compounded from the following ingredients:

| | Parts |
|---|---|
| N - (2 - acetylamino - 6 - chloro-benzyl) - N - (n-butyl)-glycine-morpholide | 50.0 |
| Lactose | 233.0 |
| Potato starch | 100.0 |
| Gelatin | 8.0 |
| Colloidal silicic acid | 5.0 |
| Magnesium stearate | 4.0 |
| Total | 400.0 |

Compounding procedure.—The glycine - morpholide compound, the lactose and the potato starch were intimately admixed with each other, and the mixture was moistened with an aqueous 10% solution of the gelatin. The moist mass was forced through a 1.5 mm.-mesh screen, and the resulting granulate was dried at 45° C. and again passed through the screen. The dry granulate was thoroughly admixed with the silicic acid and with the magnesium stearate, and the mixture was compressed into 400 mgm.-tablets. Each tablet contained 50 mgm. of the active ingredient and, when administered perorally to a warm-blooded animal of about 60 kg. body weight in need of such treatment, produced very good antitussive and respiration-stimulating effects.

EXAMPLE 36

Suppositories

The suppository composition was compounded from the following ingredients:

| | Parts |
|---|---|
| N - (2 - benzoylamino - 6 - chloro-benzyl) - N-methyl-glycine-morpholide hydrochloride | 25.0 |
| Cocoa butter | 1675.0 |
| Total | 1700.0 |

Compounding procedure.—The finely powdered glycine-morpholide compound was stirred in the cocoa butter, which had previously been melted and cooled to 40° C., and the mixture was homogenized. The composition was then poured at about 37° C. into cooled suppository molds, each holding 1700 mgm. of the mixture. Each suppository contained 25 mgm. of the active ingredient and, when administered by the rectal route to a warm-blooded animal of about 60 kg. body weight in need of such treatment, produced very good antitussive and respiration-stimulating effects.

EXAMPLE 37

Hypodermic solution

The solution was compounded from the following ingredients:

| | Parts by vol. |
|---|---|
| N - (2 - acetylamino - 6 - chlorobenzyl) - N - (n-butyl)-glycine-morpholide | 20.0 |
| Tartaric acid | 2.0 |
| Sorbitol | 50.0 |
| Distilled water, q.s. ad. | 1000.0 |

Compounding procedure.—The tartaric acid, the glycine-morpholide compound and the sorbitol were successively dissolved in a sufficient amount of warm distilled water. The solution was cooled to room temperature, diluted with distilled water to the desired volume, and filtered until free from suspended matter. The solution was then filled into white 1-cc. ampules, which were then sealed and sterilized for 20 minutes at 120° C. Each ampule contained 20 mgm. of the active ingredient, and when the contents thereof were administered parenterally to a warm-blooded animal of about 60 kg. body weight in need of such treatment, very good antitussive and respiration-stimulating effects were obtained.

Analogous results were obtained when any one of the other compounds of the Formula I above or a non-toxic acid addition salt thereof was substituted for the particular halo-substituted 2-amino-benzylamine morpholide compound in illustrative Examples 32 to 37. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound selected from the group consisting of N-(2-acetylamino-3,5-dibromobenzyl)-N-ethyl - $\beta$ - aminopropionic acid-morpholide, compounds of the formula

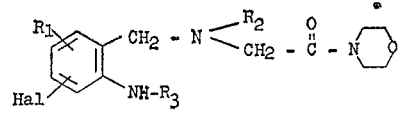

wherein
Hal is chlorine or bromine,
$R_1$ is hydrogen, chlorine or bromine,
$R_2$ is alkyl of 1 to 4 carbon atoms, phenyl or benzyl, and
R is hydrogen, alkanoyl of 2 to 4 carbon atoms, benzoyl, chlorobenzoyl, methoxybenzoyl, nicotinoyl or isonicotinoyl, and non-toxic, pharmacologically acceptable acid addition salts thereof.
2. A compound according to claim 1, which is N-(2-benzoylamino - 6 - chloro - benzyl) - N - methyl - glycine-morpholide as its hydrochloride.
3. A compound according to claim 1, which is N-(2-benzoylamino - 6 - chloro - benzyl) - N - isopropyl - glycine-morpholide.

4. A compound according to claim 1, which is N-(2-benzoylamino - 4 - chloro - benzyl) - N - methyl - glycine-morpholide.

5. A compound according to claim 1, which is N-(2-acetylamino - 3,5 - dibromo - benzy) - N - methyl - glycine-morpholide.

6. A compound according to claim 1, which is N-(2-acetylamino - 6 - chloro - benzyl) - N - isopropyl - glycine-morpholide.

No reference cited.

ALEX MAZEL, Primary Examiner
J. TOVAR, Assistant Examiner

U.S. Cl. X.R.
260—247.5

PO-1050
(5/69)

UNITED STATES PATENT OFFICE
CERTIFICATE OF CORRECTION

Patent No. 3,661,903          Dated May 9, 1972

Inventor(s) GERD KRUGER, OTMAR ZIPP, JOHANNES KECK, JOSEF NICKL, HANS MACHLEIDT, GERHARD OHNACKER, ROBERT ENGELHORN and SIGFRID PUSCHMANN It is certified that error appears in the above-identified patent and that said Letters Patent are hereby corrected as shown below:

Col. 1, line 33 - correct the spelling of "chlorobenzoyl".

Col. 4, line 53 - substitute --M. P. 94-95°C.-- for "M.P.165-166°C"
"       59 - correct "morpholine" to read --morpholide--.

Col. 7, line 41 - before "benzyl" insert --chloro- --

Col. 8, line 44 - correct "0.5" to read --5.0--;
"       69 - before "glycine" insert --N-methyl- --.

Col.10, line 63 - correct "R" to read --$R_3$--;
"       72 - correct "as" to read --or--.

Col.11, line  5 - correct "benzy" to read --benzyl--.

Signed and sealed this 6th day of February 1973.

(SEAL)
Attest:

EDWARD M.FLETCHER,JR.                 ROBERT GOTTSCHALK
Attesting Officer                     Commissioner of Patents